United States Patent Office 2,983,528
Patented May 9, 1961

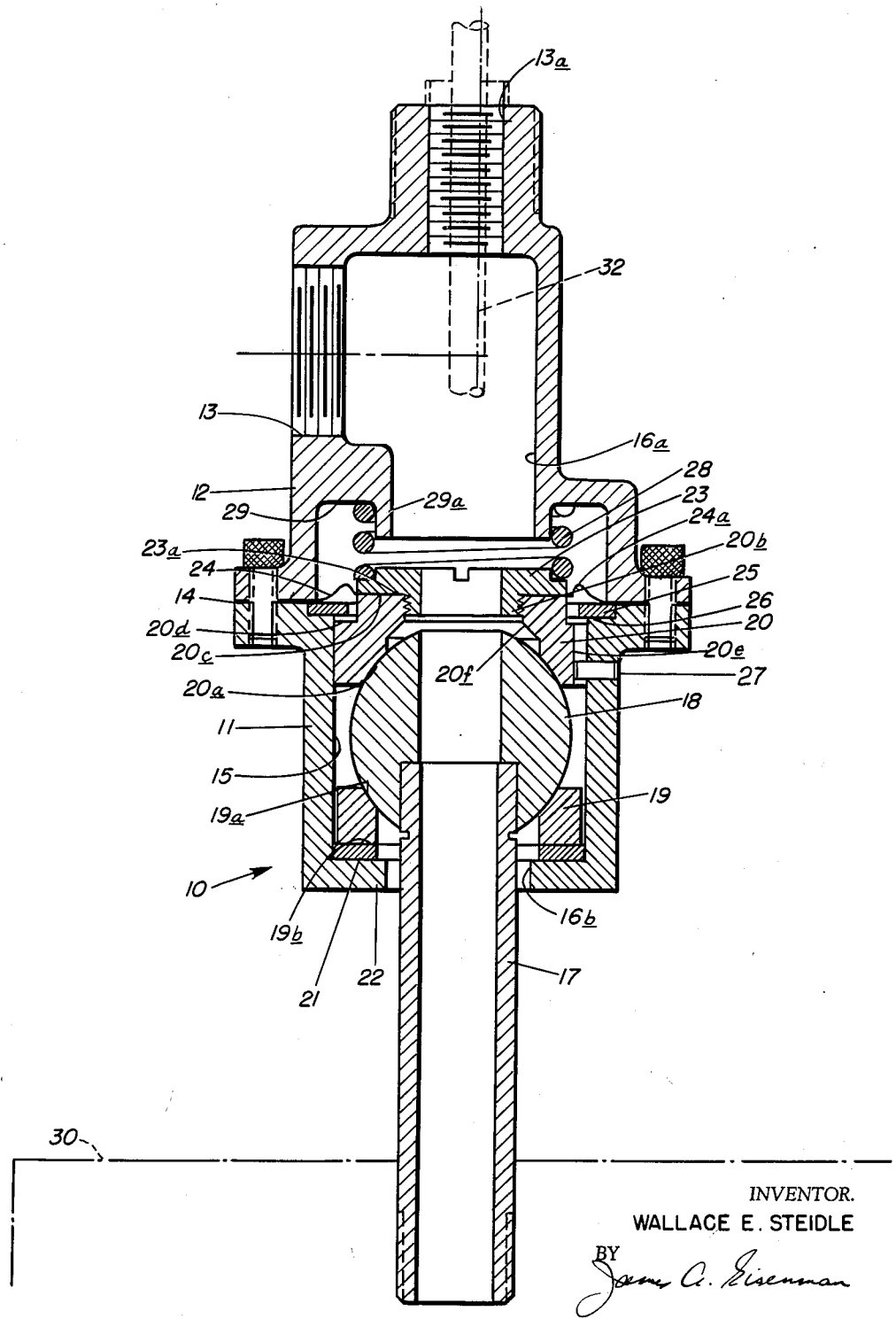

2,983,528

ROTARY JOINT

Wallace E. Steidle, 11 Lovers Lane, Huntington, N.Y.

Filed May 23, 1957, Ser. No. 661,119

2 Claims. (Cl. 285—269)

This invention relates to rotary joints for passing fluids under pressure between relatively rotatable parts.

Rotary joints have been developed for passing fluids such as steam, water, oil, and gas between relatively rotatable parts. While rotary joints can be made to give reasonably good service under certain operating conditions, they tend to be sensitive to mechanical factors such as alignment, bearing loading, wear, and the like and, generally speaking, constitute the weakest structural link in the conduit systems in which they are interposed.

Accordingly, it is one object of the present invention to provide an improved rotary joint for passing fluids between relatively rotating parts.

It is another object of the invention to provide a rotary joint which retains high sealing efficiencies under adverse operating conditions.

Another object of the invention is to provide a rotary joint in which precise alignment of the relatively rotating parts is not required.

Still another object of the invention is to provide a rotary joint in which the sealing surfaces are relieved of much of the bearing load of the relatively rotating parts.

In accordance with the present invention, there is provided a rotary joint including mating housing parts which define a closed chamber in which is received a coupling including a hollow output connector carrying on its outer surface a partial spherical surface which is engaged on either side of center by a pair of bearing rings, preferably of relatively softer material. The bearing rings are in compression between the housing and the spherical surface and afford the output connector a limited range of angles relative to the housing while it rotates. Between one of the bearing rings and the housing is a bearing surface to carry axial thrust and on which the bearing ring is able to rotate as one with the spherical surface of the output connector. Secured to the other bearing ring is a gasket-diaphragm which spans the radial distance to an adjacent joint of the mated housing parts, thereby to block fluid leakage between the bearing rings and the housing. The axial thrust of fluid pressure on the gasket-diaphragm is absorbed in part by a support which rests on the housing and in part by the bearing ring, with the pressure on the latter, augmented by a compression spring, establishing seals at the bearing surfaces.

A representative embodiment of the invention from which the above and other features will be apparent is described below, having reference to the accompanying drawing showing a rotary joint in longitudinal section.

Referring to the drawing, the invention is illustrated as embodied in a rotary joint assembly indicated generally by the numeral 10 including a pair of mated housing parts 11 and 12, the former including fluid inlet connector means 13 and, for certain applications, fluid return connector means 13a. The mated housing parts 11 and 12, flange coupled at 14, define an inner chamber 15 of generally cylindrical shape and having an inlet opening 16a and an outlet opening 16b and in which is journalled a rotary outlet member or conduit 17. The outlet member passes through the opening 16b with sufficient radial clearance to afford limited pivotal movement.

The rotary outlet member 17 is of tubular form, carrying on its inner end within the chamber 15 a spherical bearing surface 18 suspended between a pair of axially-spaced bearing rings or inserts 19 and 20. The upper bearing ring 20 and, in certain cases, the lower bearing ring 19 operate as seals to block the passage of fluid from the internal path or conduit through the unit. The bearing rings can take the form of bronze impregnated carbon, or other suitable bearing and sealing material. The lower bearing ring 19, as viewed in the drawing, includes a circular surface 19a contoured to the shape of a section of a sphere to engage the spherical surface 18 in a bearing fit. The bearing ring 19 also includes a flat bearing surface 19b on its lower edge which rides on a thrust bearing plate 21, preferably hardened steel, which rests in turn on a shoulder 22 on the lower housing part 12. The bearing ring 19 is fitted in the cylindrical chamber 15 with radial clearance and is free to rotate therein, usually as one with the connector 17 and with the sliding motion occurring between the bearing piece 21 and the bearing ring 19.

The bearing ring 20 includes a circular bearing surface 20a contoured to the shape of a section of a sphere to engage the spherical surface 18 in a bearing fit at more or less the same angle above the center of the sphere as the lower bearing ring 19 is below the center. Preferably, these angles are both in the range of 15 to 20 degrees measured from the horizontal as viewed in the drawing. The bearing ring 20 includes an internally-threaded opening 20b into which is threaded a coupling sleeve 23 having a flat or shoulder 23a which opposes a corresponding flat or shoulder 20c on the bearing ring 20, the plane of contact therebetween being close to the plane of the joint 14 between the housing parts 11 and 12. Spanning the distance between the joint 14 and the opposed flats 23a and 20c is a diaphragm 24 which can take the form of a sheet metal disk having an offset, circular, flexing rib 24a. The diaphragm serves as a gasket to seal at the joint 14 and also as a block to the passage of fluid from the inlet space around the outside edge of the bearing ring 20.

In the space immediately beneath the diaphragm 24 the bearing ring 20 is relieved to form a circumferential channel 20d to provide clearance for a supporting member 25 which can take the form of a metal washer seated on a shoulder 26 formed on the inside of the housing part 12. The bearing ring 20 is secured against rotation in the housing by means of a pin 27 entering a slot or key-way 20e in the insert member. The lower bearing ring 19 can be formed with a similar slot (not shown) so that it can be slipped into the housing past the pin 27, in those cases in which the pin is fixed. A compression spring 28 urges the assembly including the bearing ring 20 and the coupling sleeve 23 downwardly against the spherical surface 18, the spring reacting against a shoulder 29 formed in the upper housing part 11. A centering boss 29a positions the compression spring along the axis of the inlet opening 16a. The bearing ring 20 is undercut at 20f to define a predetermined area of surface contact with the spherical surface 18 and to afford a net differential area against which the fluid pressure in the coupling unit can react to urge the bearing ring 20 against the spherical surface in sealing relationship.

In operation, fluid under pressure is introduced into the unit through the inlet connector 13 (assuming for the moment that the fluid return connector 13a is blocked) to pass into the housing part 11 and through the rotary outlet member 17. Conventionally, the outlet member 17 is joined to a rotating part such as a drum 30, forming no part of the present invention, adapted to be rotated by suitable drive means (not shown). The fluid enters the relieved space 20f between the surface of the bearing ring 20 and the spherical surface 18 where it encounters the seal effected by the contact therebetween. When the system is put into operation, the contact pressure at this junction is brought about by the compression spring 28. In operation, however, a combination of pressures upwardly and downwardly by the fluid imparts a differential pressure having a net effect of a downwardly directed force. The pressure on the diaphragm 24 is absorbed in part by the housing through the supporting member 25 and in part by the bearing ring 20. In this fashion, extreme forces on the bearing ring are prevented so that rotary movement can occur with optimum sealing and wearing effects. The seal of the surface 20a obtains during the rotary movement of the outlet chamber 17 and also during limited pivotal movement thereof. It will be observed that the flat 20c on the bearing ring 20 is in a plane slightly above the plane of the joint 14. This affords latitude for wear of the relatively softer bearing ring, the pressure seal obtaining over a long life of operation.

The lower bearing 19, which is free to rotate within the housing, can partake of motion relatively to both the spherical surface 18 and the thrust bearing plate 21. It is preferred that the rotational motion occur for the most part between the bearing ring 20 and the thrust bearing plate 21. Pivotal motion occurs between the bearing ring 20 and the spherical surface 18 within limits defined by the clearance of the opening 16b. For certain installations, the space in the chamber 15 can be vented to the atmosphere so that the entire sealing effect derives from the contact between the upper bearing ring 20 and the spherical surface. A closed chamber brings the contact surface between the bearing ring 19 and the spherical surface into play as a seal which is in series with the basic seal afforded by the bearing ring 20. In this fashion, the combined impedance of two seals in series is established.

If it is desired to provide a return flow pipe for extracting material such as condensate from the treating area, an outlet pipe 32, partially illustrated in phantom lines, can be passed axially through the entire coupling unit, with a sealing gland being provided at the fluid return connector 13a. The radial clearance between the pipe 32 and the other parts of the assembly provides a toroidal path for the passage of the fluid medium introduced under pressure through the coupling unit.

While the invention has been described above having reference to a preferred arrangement thereof, it will be understood that it can take various forms and arrangements without departing from the scope of the invention which should not, therefore, be regarded as limited, except as defined in the following claims:

I claim:

1. In a coupling for joining relatively rotatable parts for the passage of fluid under pressure therebetween and to afford relative pivotal movement between the parts, a housing formed by at least two complementary parts brought together in a circumferential joint, said parts defining a tubular chamber, a rotary conduit having a partial spherical external surface within the chamber, a first bearing ring embraced by the walls of the chamber in non-rotating but axial sliding relationship therewith, said ring engaging the spherical surface on the pressure inlet side of center in pressure sealing relationship, and substantially concentrically with the axis of the tubular chamber, an internally threaded shank portion on said first bearing ring, a flat on the end of the shank portion normally disposed in a plane spaced slightly from the plane of the circumferential joint between the housing parts in a direction away from the spherical surface, an impervious, flexible, annular diaphragm clamped at its outer edge between the housing parts and having its inner edge resting on said flat, a clamping sleeve threaded into the shank portion of the first bearing ring to clamp the diaphragm to the flat, a detachable, annular support member carried by the housing, said support member having a generally flat surface facing the diaphragm and extending radially inwardly to support the diaphragm closely adjacent the first bearing ring, said support member being disposed adjacent said joint between the housing parts and engaging the diaphragm on the side adjacent the spherical surface of the rotary part, the bearing ring being radially relieved adjacent the inner edges of the support member, said diaphragm having a portion normally spaced from the annular support member whereby fluid pressure on the diaphragm presses the diaphragm progressively against the support member to cause the housing to carry increasing proportions of the fluid pressure load on the diaphragm as the fluid pressure increases compression spring means reacting against the housing to urge the first bearing ring against the spherical surface in sealing relationship, the first bearing ring being undercut for a substantial amount on its inner edge adjacent the place of engagement with the spherical surface to receive fluid under pressure, thereby to partially offset the combined effect of fluid pressure and compression spring pressure urging the first bearing ring axially against the spherical surface, a second bearing ring in the chamber interposed between the housing and the spherical surface on the other side of center from said first bearing ring.

2. A coupling assembly as set forth in claim 1, said second bearing ring being rotatably mounted in said housing and arranged to accept thrust both axially and transversely with respect to the rotary conduit, and thrust bearing means between the housing and the second bearing ring to accept the axial thrust.

References Cited in the file of this patent

UNITED STATES PATENTS

| | | |
|---|---|---|
| 859,426 | Betz | July 9, 1907 |
| 1,460,411 | Ellis | July 3, 1923 |
| 1,532,195 | Morrison | Apr. 7, 1925 |
| 2,276,221 | Magnesen | Mar. 10, 1942 |
| 2,328,898 | Goff et al. | Sept. 7, 1943 |
| 2,356,351 | Phillips | Aug. 22, 1944 |
| 2,366,541 | Malkin | Jan. 2, 1945 |
| 2,717,166 | Hedden | Sept. 6, 1955 |
| 2,907,593 | DePhillips | Oct. 6, 1959 |

FOREIGN PATENTS

| | | |
|---|---|---|
| 82,719 | Germany | Nov. 13, 1894 |
| 56,669 | Denmark | Aug. 28, 1939 |